(12) United States Patent
Wendt et al.

(10) Patent No.: US 10,028,358 B2
(45) Date of Patent: Jul. 17, 2018

(54) LIGHT MANAGEMENT SYSTEM WITH AN INTEGRATED ENERGY FUNCTION

(75) Inventors: Matthias Wendt, Wuerselen (DE);
Salvador Expedito Boleko Ribas, Barcelona (ES); Volkmar Schulz, Wuerselen (DE); Felix Henric Govert Ogg, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 388 days.

(21) Appl. No.: 12/743,820

(22) PCT Filed: Nov. 18, 2008

(86) PCT No.: PCT/IB2008/054824
§ 371 (c)(1),
(2), (4) Date: May 20, 2010

(87) PCT Pub. No.: WO2009/066234
PCT Pub. Date: May 28, 2009

(65) Prior Publication Data
US 2010/0251157 A1  Sep. 30, 2010

(30) Foreign Application Priority Data
Nov. 21, 2007 (EP) .................................. 07121226.0

(51) Int. Cl.
G06F 3/048 (2013.01)
H05B 37/02 (2006.01)
(52) U.S. Cl.
CPC ..... H05B 37/0245 (2013.01); H05B 37/0218 (2013.01); Y02B 20/40 (2013.01); Y02B 20/46 (2013.01)

(58) Field of Classification Search
CPC ............ H05B 37/0245; H05B 37/0218; Y02B 20/40; Y02B 20/46
See application file for complete search history.

(56) References Cited

U.S. PATENT DOCUMENTS

| 6,813,525 B2 | 11/2004 | Reid et al. |
| 2002/0050799 A1 | 5/2002 | Yamauchi et al. |

(Continued)

FOREIGN PATENT DOCUMENTS

| JP | 1995019998 A | 1/1995 |
| JP | 1999045782 A | 2/1999 |

(Continued)

OTHER PUBLICATIONS

Encelium: ECS Addressable Lighting Control and Energy Management System; Advertising Brochure, 6 Page Document.

(Continued)

Primary Examiner — Anil N Kumar

(57) ABSTRACT

The invention relates to the integration of an energy function into a light management system, particularly for saving energy and monitoring energy consumption. According to an embodiment of the invention, a light management system (10) with an integrated energy function is provided, wherein the system is adapted to receiving energy information about light fixtures (12-16) of a lighting system (18), and to processing the received energy information with regard to energy consumption of the lighting system (18). The energy function may be for example used to automatically configure a lighting system to low energy consumption, to allow further configurations of the lighting system with regard to lowering energy consumption, or to provide a user with a sensible set of lights that can be turned off and will amount to significant energy savings when turned off.

11 Claims, 1 Drawing Sheet

(56) References Cited

U.S. PATENT DOCUMENTS

| | | | |
|---|---|---|---|
| 2004/0002792 A1 | 1/2004 | Hoffknecht | |
| 2004/0021689 A1* | 2/2004 | Parker | G06F 3/011 |
| | | | 715/771 |
| 2004/0160199 A1* | 8/2004 | Morgan | A01M 1/04 |
| | | | 315/312 |
| 2005/0096797 A1* | 5/2005 | Matsubara | H02J 3/00 |
| | | | 700/291 |
| 2007/0040513 A1* | 2/2007 | Cleland | G01J 1/42 |
| | | | 315/159 |
| 2007/0218428 A1* | 9/2007 | Taffet | G09B 9/16 |
| | | | 434/41 |
| 2008/0092075 A1* | 4/2008 | Jacob | H05B 37/0254 |
| | | | 715/771 |
| 2009/0102617 A1* | 4/2009 | Thommes | G05B 15/02 |
| | | | 340/12.3 |

FOREIGN PATENT DOCUMENTS

| | | |
|---|---|---|
| JP | 2003162787 | 6/2003 |
| WO | 200677561 A2 | 7/2006 |
| WO | 2007127978 A2 | 11/2007 |

OTHER PUBLICATIONS

Encelium Technologies Inc.; "Energy Control for the Smart Building"; Advertising Brochure, Downloading From htttp://www.encelium.com on May 29, 2007. 22 Page Document.

* cited by examiner

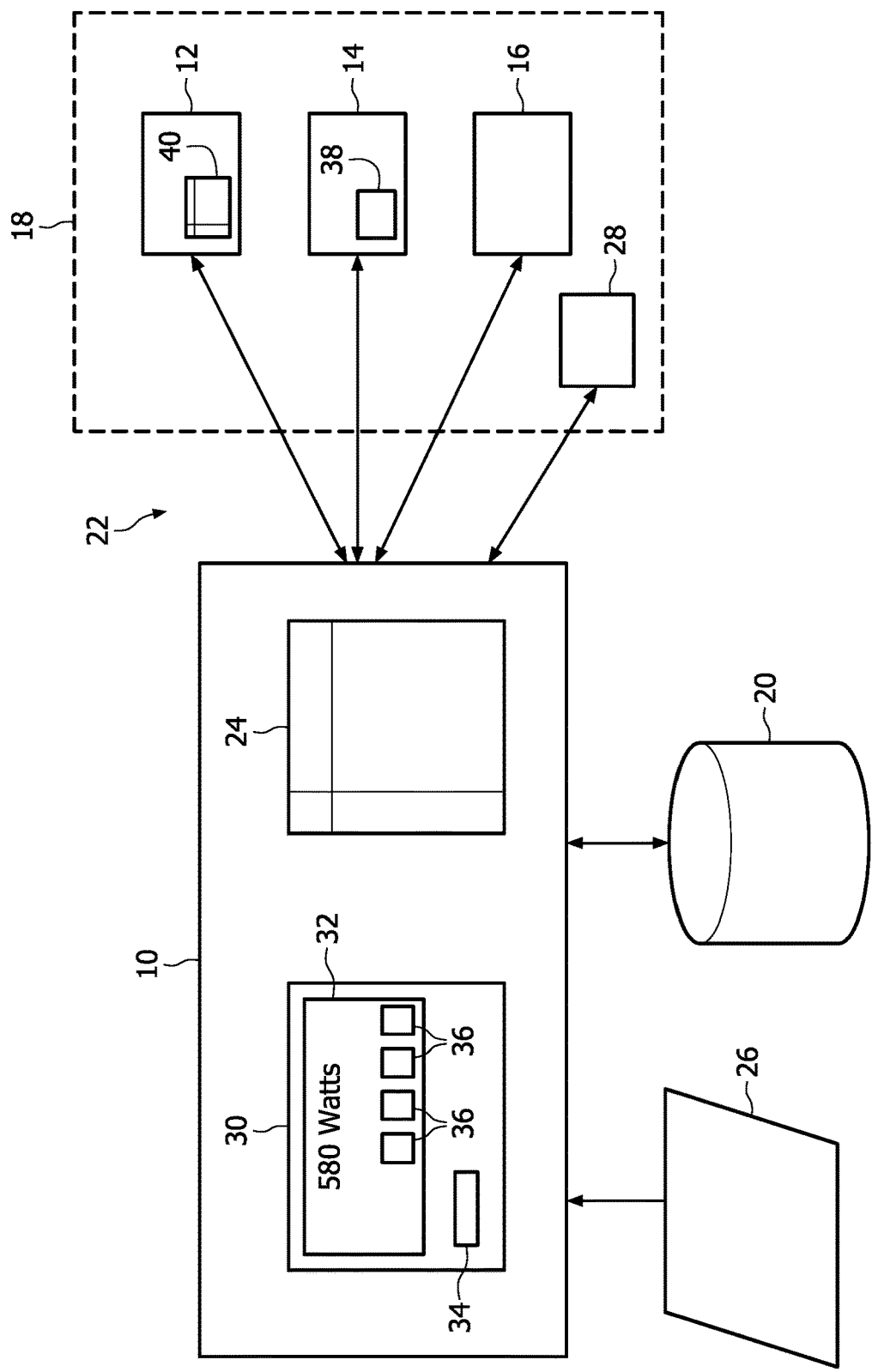

LIGHT MANAGEMENT SYSTEM WITH AN INTEGRATED ENERGY FUNCTION

The invention relates to the integration of an energy function into a light management system, particularly for saving energy and monitoring energy consumption.

Lighting systems, for example shop lighting systems, are becoming increasingly complex, with ever more lamps and options to drive those lamps. Especially, next-generation lighting control or management systems for managing and controlling complex lighting systems comprise computer systems that let the user control "atmospheres" instead of merely groups of lamps. However, these systems do not allow the user to shut down lamps at the flick of a button. Hence, users who are used to turn off lights in areas where no light is needed, e.g. a storage room, can no longer do this easily, which may result in wasted energy consumption. Furthermore, even if lights can be turned off, without expert knowledge it is nearly impossible to predict whether turning lights off and later on again amount to any energy saving at all. In fact, some lamps cannot be turned back on after being turned off for long periods of time, without endangering the rendered atmosphere or even the lifetime of the device. In addition, the anticipated high number of either lamps, fixtures or degrees of freedom at user's disposal for lighting atmosphere creation produce that elements (effects) in a light scene can be similarly rendered by alternative configuration settings of the installed lighting equipment.

US2004/0002792A1 relates to a lighting energy management system, which uses lighting fixtures, photo and occupancy sensors, personal lighting commands and an energy control unit. The energy control unit receives information from the photo and occupancy sensors and the personal controller and determines an optimal brightness command for each lighting fixture using a coordinated system of zone and fixture objects. Each zone object is associated with a building zone and each fixture object is associated with a light fixture. Each zone object ensures that lighting fixture lighting level is adjusted when a physical zone is unoccupied. Each fixture object uses sensors and personal inputs to determine a desired brightness level and uses a load shedding and daylight compensation to determine a daylight adjusted brightness level. The energy control unit determines an optimal brightness command based on these levels to minimize the energy required by the lighting fixtures. The disclosed system allows minimizing the energy required by said lighting fixtures.

It is an object of the present invention to provide a light management system, which comprises an integrated energy function.

The object is solved by the independent claim. Further embodiments are shown by the dependent claims.

A basic idea of the invention is to integrate an energy function into a light management system. The energy function may be for example used to automatically configure a lighting system to low energy consumption, to allow further configurations of the lighting system with regard to lowering energy consumption, or to provide a user with a sensible set of lights that can be turned off and will amount to significant energy savings when turned off.

An embodiment of the invention provides a light management system with an integrated energy function, wherein the system is adapted to
  receiving energy information about light fixtures of a lighting system, and to
  processing the received energy information with regard to energy consumption of the lighting system.

Energy information may mean any information with regard to the energy of a lighting fixture, particularly the energy consumption. For example, energy information may comprise a set of information such as the energy consumption of a lighting fixture at different operating condition like in a dimmed mode. The energy information enables the system for example to adjust configuration settings of light fixtures such that energy constraints may be better met. The energy function is particularly useful in a light management system, which is able to automatically render a lighting atmosphere from for example an abstract description of the lighting atmosphere.

According to a further embodiment of the invention, the system may be adapted to receiving the energy information by means of one or more of the following:
  a database, which stores energy information about the light fixtures;
  a network connection with light fixtures, wherein the light fixtures provide the energy information;
  a process of collecting energy information during a first learning phase of the light management system after installation.

The database may for example store energy information, which is supplied by the vendors of lighting fixtures, for example producers of light units. The network connection, either wired or wireless, allows for example retrieving the energy information directly from the lighting fixtures. The third possibility of receiving energy information may be implemented for example by means of dedicated methods of a light management system for learning the installed light fixtures of a lighting system, for example a kind of process for automatically detecting the installed light fixtures of the lighting system. This process may be extended not only to collect information about the capabilities of light fixtures such as dimming possibilities and colours, but also to collect energy information.

The system may further comprise according to an embodiment of the invention a memory table storing light fixtures and one or more of the following: capabilities, current settings, energy consumption, history of operation, a set of operation constraints and/or rules of light fixtures. The energy consumption may be for example an estimated energy consumption of a light fixture, for example in plain Watts. The energy consumption may comprise for example a set of values, each for a certain configuration of a light fixture, such as the energy consumption at different dimming levels. The history of operation may provide useful hints for the system with regards to lifetime and ageing "stress" of light fixtures, thus enabling the system to take also these aspects into account. The table may be for example automatically generated during a learning phase of the light management system.

The system may be in a further embodiment of the invention adapted to
  receiving configuration settings for light fixtures of the lighting system,
  determining configuration settings yielding similar light effects as intended by a user, but requiring smaller energy consumption, by means of the received energy information, and to
  matching the received configuration settings with the determined configuration settings.

Thus, in a light management system, which is able to automatically render a desired lighting atmosphere, the configuration settings created during the rendering process may be further adjusted with regard to energy consumption. It should be noted that the receiving of configuration settings by the system may also comprise the creation of the settings by the system itself, for example by automatically rendering a desired lighting atmosphere from an abstract description thereof.

In further embodiment of the invention, the system may be adapted to automatically rendering a lighting atmosphere with the lighting system in a two step process comprising
- a first step for evaluating suited configuration settings for the light fixtures of the lighting system without taking the received energy information into account and computing initial configuration settings for the lighting system, and
- a second step for adjusting the initial configuration settings by taking the received energy information into account.

This two step process of rendering a lighting atmosphere allows to take energy considerations into account, particularly to overcome limitations or meet requirements with regard to computation time. In the first step, an initial lighting atmosphere may be rendered without additional burden in terms of computational time. In the second step, the rendered lighting atmosphere may be adjusted taking any energy constraints and information into account. Thus, a user may obtain quickly the initial lighting atmosphere, which is then further refined in order to meet any energy constraints or requirements.

According to a further embodiment of the invention, the system may be further adapted to collecting energy information by means of a dark room calibration process, wherein the dark room calibration process is extended in performing energy consumption measurements of lighting fixtures of the lighting system. A dark room calibration (DRC) process is usually used in a lighting system to identify the behaviour and capabilities of the installed lighting equipment, particularly the light fixtures. For example, DRC may be applied by a light management system to "learn" something about the light fixtures of an installed lighting system. More specifically, the DRC may consist in performing photometric measurements for individual degrees of freedom of the lighting system.

According to a further embodiment of the invention, the dark room calibration process may be extended in that it synchronously measures and records the energy consumption of separately controllable lighting fixtures of the lighting system in various dim and colour modes. This may not require additional time as the light management system usually powers during DRC single lamps or light fixtures up and exercises stepwise through dim levels to register non-linearities regarding light intensity and/or spectral behaviour. While this powering up of single light fixtures and stepwise dimming the fixtures, also the energy or power consumption of the single light fixtures may be measured. The energy consumption may be measured at a central place of a room or office.

For performing the measurement and recording, the system may in an embodiment of the invention further comprise a dedicated sensor node for performing the measurement of the energy consumption. The measurements may be stored in a central database with an identification of the respective light fixture.

According to a further embodiment of the invention
- the receiving of energy information about light fixtures of a lighting system may comprise measuring energy consumption of the lighting system, and
- the processing of the received energy information with regard to energy consumption of the lighting system may comprise performing small changes of the configuration settings of lighting fixtures of the lighting system so that the energy consumption is lowered, wherein the small changes are chosen such that the changes of a lighting atmosphere rendered by the lighting system due to the performed small changes are not recognizable by the human eye.

Thus, no database with energy requirements is required. Instead, the system may continuously measure the energy consumption and adjust a rendered lighting atmosphere in that the energy consumption may be lowered.

According to a further embodiment of the invention, a user interface for a light management system, particularly for a system according to the invention, is provided, wherein the interface is adapted to present an energy consumption meter that displays the energy consumption of a lighting system, which is controlled by the light management system.

The interface may be for example implemented as software, processed by a controller of for example a central control station of a light management system. The controller may be for example a dedicated computer with a display, which is provided to present the interface as a Graphical User Interface (GUI) to a user.

The user interface may according to a further embodiment of the invention comprise a conserve energy button, wherein the interface may be further adapted to display a control panel with a set of options buttons upon actuation of the conserve energy button, each being adapted upon actuation to cause a light management system to change a current lighting scenario such that energy provisions related to the actuated option button are essentially met by the lighting system.

The conserve energy button may be implemented as part of the GUI or as a separate button.

The user interface may be further adapted in an embodiment of the invention to anticipate the expected energy consumption of the lighting system based on received configuration settings for light fixtures of the lighting system.

For example, the interface may comprise software which is adapted to compute an estimation of the energy consumption based on data of the light fixtures of the lighting system and the received configuration settings. The anticipated expected energy consumption may then be displayed for example on the GUI of a controller of the light management system.

Furthermore, an embodiment of the invention provides a light fixture being adapted to provide energy information to a light management system, particularly a light management system according to the invention.

The light fixture may be a lamp, such as a Solid State Lighting Device (SSLD) or a halogen bulb or another lighting means. The light fixture may contain an electronic circuitry for providing the energy information, for example via a wired or wireless network.

The light fixture may be according to an embodiment of the invention adapted to measure energy consumption and to provide the measured energy consumption as energy information to the light management system.

For example, the light fixture may contain a measurement electronic which is adapted to continuously measure the energy consumption of the light fixture. The electronic may further comprise for example a network interface, which may be adapted to communicate with a central controller of the light management system and to transmit the measured energy consumption.

Furthermore, in an embodiment of the invention, the light fixture may be adapted to store energy information, for example in an internal storage.

For example, the light fixture may contain a memory device, such as a ROM (Read Only Memory), which stores data about the light fixture, such as the energy consumption at different dimming stages. Furthermore, the memory device may be readable from external of the light fixture, particularly from a central controller, which is connected with the light fixture via a network for controlling the lighting system.

A further embodiment of the invention provides a method for managing a lighting system with a light management system according to the invention, comprising
receiving energy information about light fixtures of the lighting system, and
processing the received energy information with regard to manual control of light fixtures and energy consumption of the lighting system.

According to a further embodiment of the invention, a computer program may be provided, which is enabled to carry out the above method according to the invention when executed by a computer.

According to a further embodiment of the invention, a record carrier storing a computer program according to the invention may be provided, for example a CD-ROM, a DVD, a memory card, a diskette, or a similar data carrier suitable to store the computer program for electronic access.

Finally, an embodiment of the invention provides a computer programmed to perform a method according to the invention and comprising an interface for communication with a lighting system.

These and other aspects of the invention will be apparent from and elucidated with reference to the embodiments described hereinafter.

The invention will be described in more detail hereinafter with reference to exemplary embodiments. However, the invention is not limited to these exemplary embodiments.

FIG. 1 shows an embodiment of a light management system with an energy function according to the invention In the following, functionally similar or identical elements may have the same reference numerals.

The present invention includes energy consumption knowledge into a lighting control system or a light management system and may provide a user with a sensible set of lights that:
can be turned off;
will amount to a significant energy savings when turned off.

Sensible choices may include dimming a whole area to lower intensity instead of turning off the lamps there. Also, it may be provided that some areas cannot be dimmed below a threshold for safety reasons.

Furthermore, the incorporated energy consumption knowledge can also be used by the light management system during run-time in order to increase the energy efficiency of highly redundant (in terms of functionality) lighting installations.

The mentioned information on the energy consumption may be acquired in several ways
It can be supplied by the vendors of the light fixtures and from there be brought into a database used by the light management system or;
It can be stored ore measured inside a light fixture and provided to the light management system over a network connection;
Or it can be collected during a first learning phase after installation.

FIG. 1 shows a light management system 10, which is provided for controlling a lighting system 18, which comprises several light fixtures 12, 14, and 16, for example SSLDs or halogen bulbs. The lighting system 18 and particularly the light fixtures 12 to 16 are connected to the light management system 10 over a wired and/or wireless network comprising network connections 22. The light management system 10 is able to read in a file containing an abstract description of a lighting atmosphere. Furthermore, the system 10 has access to database 20 containing energy information about the light fixtures 12 to 16 of the lighting system.

The system 10 further comprises a user interface 30 for controlling the creation of the desired lighting atmosphere with regard to energy aspects. The user interface 30 comprises a display 32, for example a LCD (Liquid Crystal Display), displaying information for the user about the lighting system. The user interface will present the user with an energy consumption meter (Watt or $/hour using energy cost per watt) that shows the current energy consumption.

A conserve-energy button 34 opens up upon actuation a control panel, with a set of option buttons 36, each representing a scenario-adaptation of the current lighting that will amount to significant energy saving. Example options of a lighting system of for example a shop may be as follows:
"dim main lighting to −10%" (because dimming to 10% less is the minimum allowed lighting level within the shop, during shop opening times.)
"turn off cash register decorative lighting" (functional lighting kept on, if the shop is full of customers the decorative lighting is invisible anyway)
"dim storage room lighting to minimal" (there is no one in the storage room, only two people manning the store today, both working the shop floor).

The conserve energy button 34 may be also provided for allowing a user to easily change the configuration settings of the lighting system 18 in order to save energy, for example to allow turning off a set of lights of the lighting system 18 for saving energy. For example, the option buttons 36 may display several energy saving options and the lights, which are switched off for fulfilling the presented energy saving options. Thus, a user may easily choose which lights to switch off in order to achieve the desired energy savings.

In addition, the user-interface may incorporate some software that after being given as an input the intended configuration (settings) for the light fixture(s) could anticipate the expected power consumption so that the user could consider the convenience of using it, or instead to let the light management system 10 try to match settings yielding similar effects as the intended by the user, but requiring a smaller power consumption. Also the light management system 10 may check the convenience of adopting the configuration suggested by the user taking into account some pre-scheduled lighting tasks.

The light management system 10 further contains a memory table 24 of the light fixtures 12 to 16 and their capabilities (e.g. the colour range capabilities, the light type—spot/ambient), current settings (dim level, on/off). In particular, the memory table 24 contains this information:
energy consumption—estimated energy consumption of a light fixture, plain Watts. Possibly dimensioned for the current dimming level or other configuration parameters (dimensions) of the light fixture.
History—the time the light fixture has been on, as well as the operation conditions applied. As the operation conditions might provide useful hints to the light management system 10 with regards to lifetime or ageing "stress".
A set of constraints or (probably hard-coded) embedded rules, e.g. "lamp may not be dimmed below 1000 lumen"

and "if turned off, it must wait for 10 minutes to turn on again", "if the lamp has burnt more than X W*hours its efficiency is expected to go down" that assist either a human user or the light management system 10 to make decisions regarding the use of the light fixture(s) taking into account energy concerns.

During run-time of the light management system 10, whenever a lighting atmosphere is to be rendered from an abstract description file 26, the determination of the suited settings for the light fixtures 12 to 16 may be accomplished in a two-step fashion (only if needed, e.g. to overcome limitations or meet requirements with regards to computation time).

Firstly, suited settings are evaluated by the light management system 10 not taking into account any constraint or energy efficiency concern. As a result, initial settings can be computed by the light management system 10 without additional burden in terms of computational time.

Secondly, once the likely sub-optimal initial settings from the energy management point of view has been computed by the light management system 10, translated into lighting commands and fed to the lighting fixtures 12 to 16, then the energy efficiency constraints and information are be considered by the system 10.

The above two time-scale approach enables a sub-optimal rendering to be computed quickly, and then runs in the background in order to reach traded-off optimal solutions.

Moreover, the initially computed solution can be used as starting point to compute the optimal solution (in both, the photometric and energy-consumption sense), so that convergence to a solution can be accelerated and also as a reference from which bounds, in terms of photometric (rendering) accuracy can be set, in order to fix how much degradation can be tolerated to label a trade-off solution as acceptable.

Finally, multi objective optimization techniques may be applied, which yield one or more solutions, among which—if boundaries in terms of photometric requirements have been adopted—the one yielding minimum power consumption can be chosen.

The energy information, particularly energy or power consumption data, can be collected by the light management system 10 during a sort of discovery process. An example of such a process can be given by the so-called Darkroom Calibration (DRC), which is a operation used to identify the behaviors and capabilities of the installed lighting equipment, particularly the light fixtures 12 to 16. This allows using that the resulting data by the light management system 10 in order to automatically evaluate suited settings in order to render a desired lighting atmosphere.

More specifically, the mentioned DRC consists in performing photometric measurements for individual degrees of freedom of the lighting system 18. It may be extended by performing power consumption measurements, synchronously measuring the power consumption of the separate controllable light fixtures 12 to 16 or lamps of the lighting system in the various dim and color modes. This does not take additional time as the system 10 anyway powers single lamps up and exercises stepwise through dim levels to register nonlinearities regarding light intensity and/or spectral behavior. Now additionally the power consumption gets recorded by the system 10. Beneficially as all of the light fixtures 12 to 16 are kept off during DRC this basic power consumption can be measured at a central place of a room or floor. As additional power might be consumed by devices not related to light generation these should to be switched off during DRC. However, if the mentioned non light generation related power consumption is small relative to the consumption of the light installation another solution would be to measure this consumption with all lamps off and use that for the further measurements as an offset.

The power measurement can be performed in a dedicated sensor node 28 of a wireless or wired light management network 22. Then, similarly as it is done with photometric information, the registered values can be stored in a database that is to be lately used by the light management system 10, for example in the memory table 24.

Alternatively or additionally, a light fixture 14 may measure or estimate its energy consumption by means of a measurement means 40 and may communicate the measurements into the parameter database of the light fixtures 12 to 16, as stored in the memory table 24, used for the optimization of the lighting atmosphere during rendering with the two stage process as described above. For this embodiment, energy optimization capability is part of the light fixture or lamp node and can be sold as additional feature of the light fixture.

Also, a light fixture 12 may comprise a memory table 40 containing parameters as the energy or power consumption of the fixture under different operating conditions, for example at different dimming stages of the fixture. The parameters may be read out the light management system 10, for example during a discovery process of the light fixtures 12 to 16 of the lighting system 18. Light fixtures such as lamps, where the power consumption can not be measured, may come with a database provided by the manufacturer. An installer of the light fixture can integrate these information in for example the database 20 when installing new light sources.

Also, a light management system may be provided according to the invention, which does not require a database of power requirements. Here, the light management system may set a light scene or lighting atmosphere and measures power consumption. During future small changes that are not recognizable by the human eye the light management system may then automatically determine change direction of the power consumption that lead to lower consumption and may approximate best power performance iteratively over time. In such an embodiment of the invention, the energy information is obtained by performing the measurements of power consumption.

The invention may be applied in future light management or control systems, particularly next generation systems, which take energy considerations into account when creation lighting scenes or atmospheres. The invention allows implementing an energy function into light management or control systems, wherein the implemented energy function offers numerous possibilities such as creating a user interface with energy options, the consideration of energy restrictions in a lighting system, or generally the determination and reduction of the energy consumption.

At least some of the functionality of the invention may be performed by hard- or software. In case of an implementation in software, a single or multiple standard microprocessors or microcontrollers may be used to process a single or multiple algorithms implementing the invention.

It should be noted that the word "comprise" does not exclude other elements or steps, and that the word "a" or "an" does not exclude a plurality. Furthermore, any reference signs in the claims shall not be construed as limiting the scope of the invention.

The invention claimed is:

1. A light management system with an integrated energy function for automatically configuring a lighting system at a lower energy consumption, wherein the system comprises memory and one or more processors configured to perform the following operations:

receiving energy information about light fixtures of the lighting system, wherein the energy information comprises an energy consumption of the light fixtures at different operating conditions;

reading from a file an abstract description of a lighting atmosphere rendered by the lighting system; and automatically rendering the lighting atmosphere with the lighting system, the lighting atmosphere comprising light effects;

wherein automatically rendering the lighting atmosphere with the lighting system comprises:

evaluating suited configuration settings for the light fixtures of the lighting system, based on the abstract description of the lighting atmosphere, without taking the received energy information into account, and computing initial configuration settings for the lighting system, and feeding the initial configuration settings to the light fixtures via network connections; and adjusting the initial configuration settings for yielding similar light effects with lower energy consumption by computing, by the lighting management system, adjusted configuration settings for the light fixtures using a multi-objective optimization technique taking into account a photometric rendering accuracy bound for fixing how much degradation can be tolerated to label similar light effects as acceptable, an energy efficiency constraint, and the received energy information with regard to energy consumption of the lighting system.

2. The system of claim 1, being further adapted to receive the energy information by way of one or more of the following:

a database storing energy information about the light fixtures;

a network connection with the light fixtures, wherein the light fixtures provide the energy information; or a process of collecting energy information during a first learning phase of the light management system after installation.

3. The system of claim 2, comprising a memory table storing, for the light fixtures, at least one of the following: capabilities, current settings, energy consumption, history of operation, a set of constraints or embedded rules regarding the use of the light fixtures.

4. The system of claim 2, further configured to collect energy information using a dark room calibration process, wherein the dark room calibration process comprises performing photometric measurements for different operating conditions of the light fixtures, and wherein the dark room calibration process is extended with a step of performing energy consumption measurements of light fixtures of the lighting system.

5. The system of claim 4, wherein energy consumption measurements are performed to synchronously measure and record the energy consumption of separately controllable light fixtures of the lighting system in multiple dim and color modes.

6. The system of claim 5, further comprising a dedicated sensor node for performing the measurement of the energy consumption.

7. The system of claim 3, wherein adjusting the initial configuration settings for yielding similar light effects comprises performing incremental changes of the configuration settings of light fixtures of the lighting system so that the energy consumption is lowered, wherein the incremental changes are chosen such that the changes of a lighting atmosphere rendered by the lighting system due to the performed incremental changes are not recognizable by the human eye.

8. The system of claim 3 further comprising a user interface comprising a display adapted to present an energy consumption meter that displays the energy consumption of the lighting system, which is controlled by the light management system and a conserve energy button, wherein the interface is further adapted to display a control panel with a set of options buttons upon actuation of the conserve energy button, each being adapted upon actuation to cause a light management system to change a current lighting atmosphere such that energy provisions related to the actuated option button are met by the lighting system.

9. The system of claim 8, wherein the user interface further comprises a graphical element that is selectable to compute an estimation of the expected energy consumption of the lighting system based on received configuration settings for light fixtures of the lighting system and data of the light fixtures.

10. A method for managing a lighting system, comprising:
receiving energy information about light fixtures of the lighting system, wherein the energy information comprises an energy consumption of the light fixtures at different operating conditions;

reading from a file an abstract description of a lighting atmosphere rendered by the lighting system; and automatically rendering the lighting atmosphere with the lighting system, the lighting atmosphere comprising light effects;

wherein automatically rendering the lighting atmosphere with the lighting system comprises:

evaluating suited configuration settings for the light fixtures of the lighting system, based on the abstract description of the lighting atmosphere, without taking the received energy information into account, and computing initial configuration settings for the lighting system, and feeding the initial configuration settings to the light fixtures via network connections; and adjusting the initial configuration settings for yielding similar light effects with lower energy consumption by computing, by the lighting management system, adjusted configuration settings for the light fixtures using a multi-objective optimization technique taking into account a photometric rendering accuracy bound for fixing how much degradation can be tolerated to label similar light effects as acceptable, an energy efficiency constraint, and the received energy information with regard to energy consumption of the lighting system.

11. At least one non-transitory computer-readable medium being coupled with one or more processors and comprising instructions that, in response to execution of the instructions by the one or more processors, cause the one or more processors to perform the following operations:

receiving energy information about light fixtures of a lighting system, wherein the energy information comprises an energy consumption of the light fixtures at different operating conditions;

reading from a file an abstract description of a lighting atmosphere rendered by the lighting system; and automatically rendering the lighting atmosphere with the lighting system, the lighting atmosphere comprising light effects;

wherein automatically rendering the lighting atmosphere with the lighting system comprises:

evaluating suited configuration settings for the light fixtures of the lighting system, based on the abstract description of the lighting atmosphere, without taking the received energy information into account, and computing initial configuration settings for the lighting system, and feeding the initial configuration settings to the light fixtures via network connections; and adjusting the initial configuration settings for yielding similar light effects with lower energy consumption by computing, by the lighting management system, adjusted configuration settings for the light fixtures using a multi-objective optimization technique taking into account a photometric rendering accuracy bound for fixing how much degradation can be tolerated to label similar light effects as acceptable, an energy efficiency constraint, and the received energy information with regard to energy consumption of the lighting system.

* * * * *